US007246004B2

(12) United States Patent
Dudek et al.

(10) Patent No.: US 7,246,004 B2
(45) Date of Patent: Jul. 17, 2007

(54) NONLINEAR FUEL DYNAMICS CONTROL WITH LOST FUEL COMPENSATION

(75) Inventors: Kenneth P. Dudek, Rochester Hills, MI (US); Ronald A. Davis, Commerce Township, MI (US); Layne K. Wiggins, Plymouth, MI (US); Lee C. Walker, Swartz Creek, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 0 days.

(21) Appl. No.: 11/400,790

(22) Filed: Apr. 7, 2006

(65) Prior Publication Data

US 2006/0271268 A1 Nov. 30, 2006

Related U.S. Application Data

(60) Provisional application No. 60/672,592, filed on Apr. 19, 2005.

(51) Int. Cl.
*G06F 17/00* (2006.01)
*F02M 51/00* (2006.01)
*F02D 41/04* (2006.01)

(52) U.S. Cl. ....................... 701/103; 123/480; 123/486

(58) Field of Classification Search ................ 701/103, 701/104, 105; 123/478, 480, 486
See application file for complete search history.

(56) References Cited

U.S. PATENT DOCUMENTS 6,615,803 B2 * 9/2003 Kojima et al. .............. 123/480
6,792,927 B2 * 9/2004 Kobayashi .................. 123/480

FOREIGN PATENT DOCUMENTS

JP 2004-286037 A * 10/2004
JP 2004-346912 A * 12/2004

OTHER PUBLICATIONS

U.S. Appl. No. 60/672,593, filed Apr. 19, 2005, Kenneth Dudek.

* cited by examiner

*Primary Examiner*—Hieu T. Vo
(74) *Attorney, Agent, or Firm*—Christopher DeVries

(57) ABSTRACT

A fuel control system delivers fuel to an engine cylinder and compensates for lost fuel. The fuel control system comprises a fuel dynamics module that determines a fuel dynamics model that is indicative of fuel behavior. The fuel dynamic module determines an inverse of the fuel dynamics model, receives a fuel command, and generates an adjusted fuel command based on the fuel command and the inverse of the fuel dynamics model. A lost fuel compensation module receives the adjusted fuel command and generates a final fuel command based on the adjusted fuel command and a lost fuel factor. A control module controls fuel delivery according to the final fuel command.

14 Claims, 4 Drawing Sheets

NONLINEAR FUEL DYNAMICS CONTROL WITH LOST FUEL COMPENSATION

CROSS-REFERENCE TO RELATED APPLICATIONS

This application claims the benefit of U.S. Provisional Application No. 60/672,592, filed on Apr. 19, 2005. The disclosure of the above application is incorporated herein by reference in its entirety.

FIELD OF THE INVENTION

The present invention relates to internal combustion engine control, and more particularly to controlling fuel delivery based on lost fuel compensation.

BACKGROUND OF THE INVENTION

Fuel control systems for automotive vehicles determine an amount of fuel to inject into an engine cylinder based on certain engine parameters. Fuel delivery may depend on engine parameters such as air flow, engine temperature, and fuel burned in a preceding combustion cycle. For example, in cold engines, not all of the fuel injected into the engine cylinder is burned during combustion. Fuel that is not burned in a combustion cycle is referred to as "lost fuel." Some fuel may be passed directly through to the exhaust without being burned. Additionally, some fuel may drip down the cylinder walls and mix with engine oil. Therefore, cold engines typically require more fuel to be injected than the amount of fuel to be burned to compensate for the lost fuel.

Generally, automotive manufacturers implement some form of compensation in the fuel control system to compensate for the lost fuel and/or "wall wetting." For example, gain scheduling can be used to vary the compensation parameters over operating conditions of the engine. Alternatively, the fuel control system may add extra fuel to the fuel command to offset the lost fuel. However, current methods do not adequately determine lost fuel or non-linear fuel dynamics behavior.

SUMMARY OF THE INVENTION

A fuel control system includes a fuel dynamics module that is indicative of fuel behavior. The fuel dynamics module determines an inverse of the fuel dynamics model, receives a fuel command, and generates an adjusted fuel command based on the fuel command and the inverse of the fuel dynamics model. A lost fuel compensation module receives the adjusted fuel command and generates a final fuel command based on the adjusted fuel command and a lost fuel factor. A control module controls fuel delivery according to the final fuel command.

In another feature of the invention, a fuel control method comprises generating a base fuel command. A fuel dynamics model that is indicative of fuel behavior is determined. An inverse of the fuel dynamics model is determined. An adjusted fuel command is generated based on the inverse of the fuel dynamics model and the base fuel command. A final fuel command is generated based on the adjusted fuel command and a lost fuel factor. Fuel delivery is controlled according to the final fuel command.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
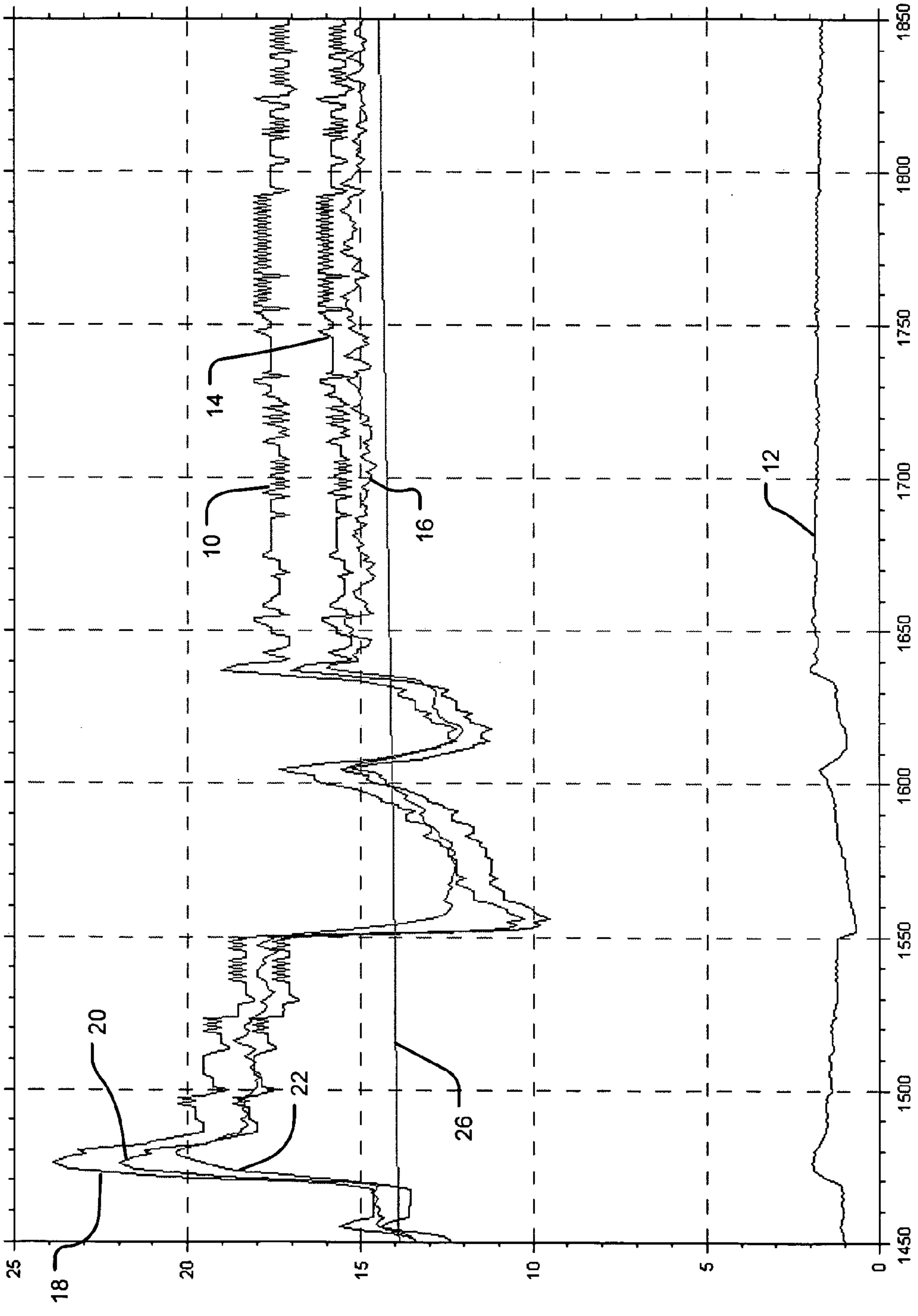
FIG. 1 Prior Art
FIG. 1 is a graphical representation of a relationship between a fuel command, lost fuel, a lost fuel adjusted fuel command, and measured fuel according to the prior art.

The following description of the preferred embodiment(s) is merely exemplary in nature and is in no way intended to limit the invention, its application, or uses. For purposes of clarity, the same reference numbers will be used in the drawings to identify similar elements. As used herein, the term module and/or device refers to an application specific integrated circuit (ASIC), an electronic circuit, a processor (shared, dedicated, or group) and memory that execute one or more software or firmware programs, a combinational logic circuit, and/or other suitable components that provide the described functionality.

A lost fuel scheduling method of the present invention accurately determines lost fuel and integrates the effects of lost fuel directly into fuel dynamics control. The lost fuel scheduling method also includes a specially formulated non-linear term in its fuel dynamics model that permits the use of accurate, robust, and analytical calibration methods. As a result, the lost fuel scheduling method and the non-linear fuel dynamics model provide more accurate fuel control, decreased calibration effort, and less reliance on calibrator skill. More accurate fuel control leads to reduced system cost because it allows for reduced catalyst loadings while still-meeting emission standards. Decreased calibration effort and reduced reliance on calibrator skill reduces fixed system cost.

A fuel control system delivers fuel to an engine cylinder as shown in FIG. 1. The fuel control system delivers fuel according to a fuel command 10. The fuel control system commands more fuel than the engine cycle requires in order to compensate for lost fuel 12. A lost fuel adjusted fuel command 14 is indicative of the fuel command 10 and lost fuel 12. In other words, the lost fuel adjusted fuel command 14 is a difference between the fuel command 10 and the lost fuel 12. An actual amount of fuel measured in the exhaust from the cylinder is represented as measured fuel 16. Hereinafter, "measured fuel" will refer to the burned fuel measured in the exhaust from the cylinder. Engine coolant temperature is shown at 26.

Figure 2:
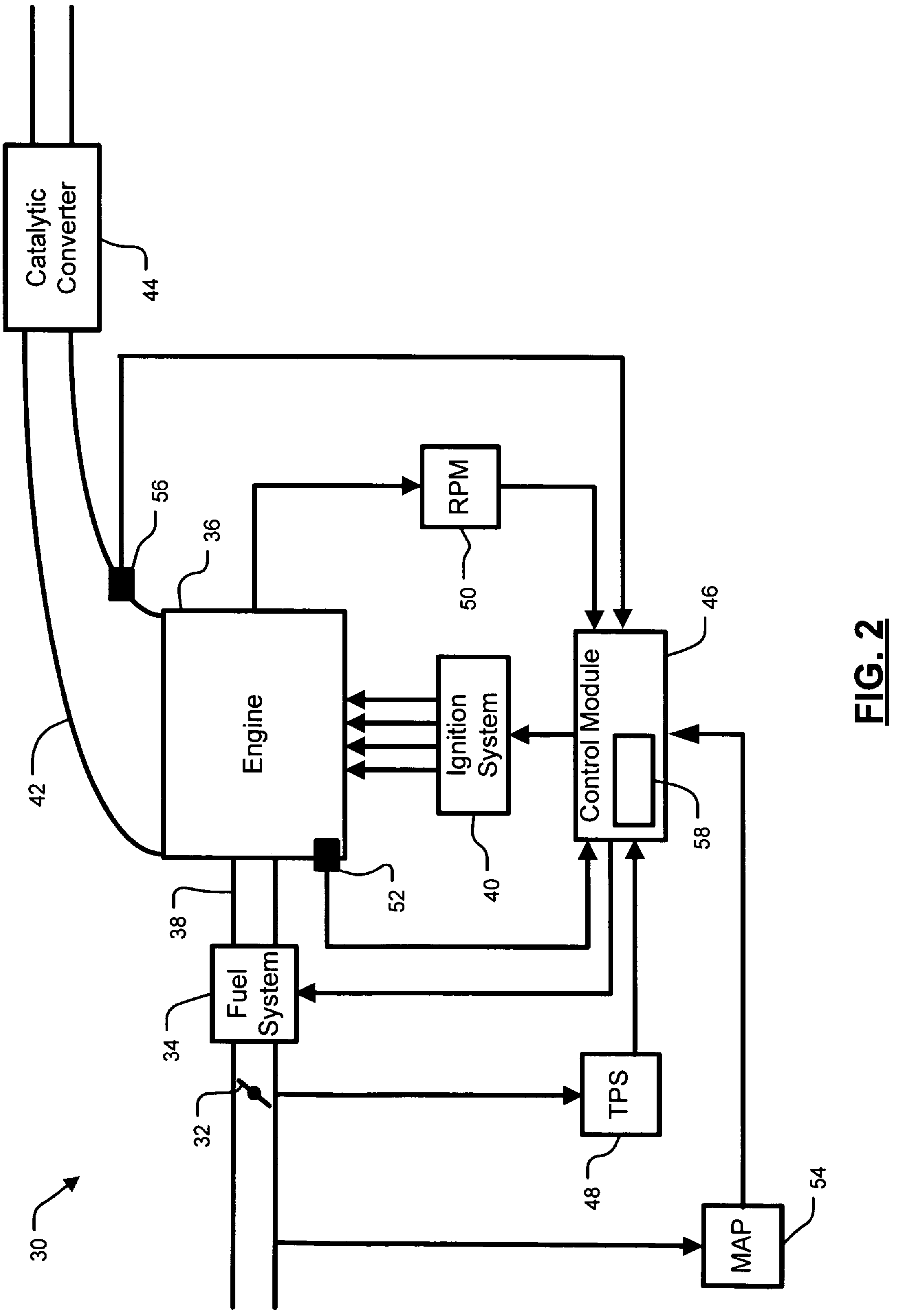
FIG. 2 is a functional block diagram of an engine control system that implements a lost fuel scheduling method according to the present invention.

Referring now to FIG. 2, an engine control system 30 is shown. A throttle 32 and fuel system 34 determine air and fuel delivered to an engine 36 through an intake manifold 38. An ignition system 40 ignites an air/fuel mixture in the engine 36. Exhaust gas created by the ignition of the air/fuel mixture is expelled through the exhaust manifold 42. The catalytic converter 44 receives the exhaust gas and reduces emissions levels of the exhaust gas.

A control module 46 communicates with various components of the engine control system 30, including, but not limited to, a throttle position sensor 48 (TPS), the fuel system 34, the ignition system 40, and an engine speed sensor 50 (RPM). The control module 46 receives a throttle position signal from the TPS 48 and determines air flow into the engine 36. The air flow data is then used to calculate fuel delivery from the fuel system 34 to the engine 36. The control module 46 further communicates with the ignition system 40 to determine ignition spark timing.

The control module 46 may receive additional signals from other components in the engine control system 30. The control module 46 receives an engine coolant temperature from an engine coolant temperature sensor 52. The control module 46 receives an engine speed from the engine speed sensor 50. The control module 46 receives a manifold absolute pressure (MAP) from a MAP sensor 54. The control module 46 receives a measured burned fuel mass from an exhaust sensor 56. These and other variables may affect the overall performance and behavior of the engine control system 30.

The control module 30 controls fuel delivery to the engine 36 through the fuel system 34 according to the non-linear fuel dynamics with lost fuel compensation scheduling method of the present invention. The control module 30 includes a memory 58 that stores data for implementing the non-linear fuel dynamics with lost fuel compensation scheduling method. In the present implementation, the memory 58 stores one or more fuel control models that define and/or predict fuel dynamics behavior. For example, the memory 58 stores a lost fuel scheduling model, which further includes a nominal fuel dynamic compensator model, a lost fuel compensator model, and/or a non-linear fuel dynamics compensator model. The control module 30 generates a fuel command according to engine parameters such as engine speed, MAP, and coolant temperature, as well as the lost fuel scheduling model.

Figure 3:
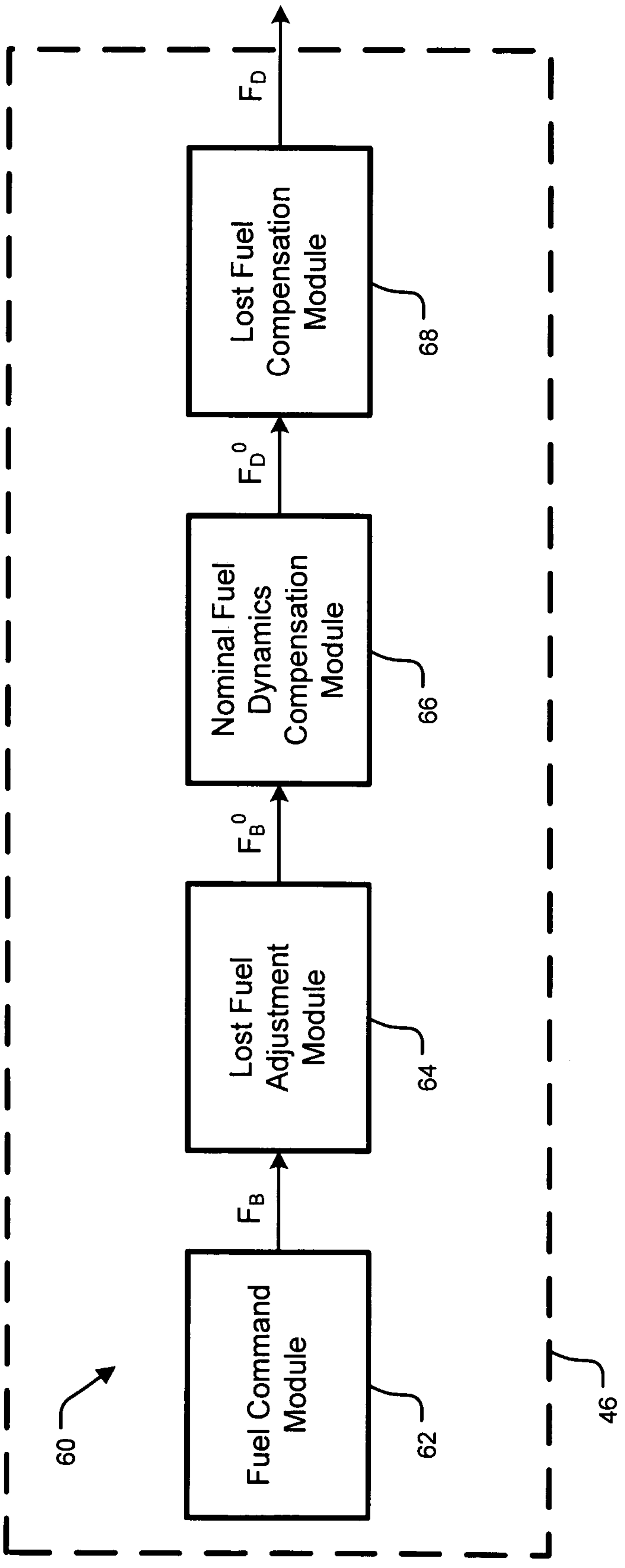
FIG. 3 is a functional block diagram of a fuel control model with lost fuel compensation according to the present invention.

The control module 46 implements the lost fuel scheduling and nonlinear fuel dynamics models 60 as shown in FIG. 3. The lost fuel scheduling and nonlinear fuel dynamics models 60 determine lost fuel and non-linear fuel dynamics compensation, and control fuel delivery to an engine cylinder according to a non-linear fuel dynamics with lost fuel compensation scheduling method as described below. A fuel command module 62 determines a base fuel command $F_B$ according to engine performance requirements. As described in FIG. 1, the base fuel command $F_B$ is sufficiently greater than a lost fuel adjusted fuel command $F_B^0$ to compensate for lost fuel. A lost fuel adjustment module 64 receives the base fuel command $F_B$. The lost fuel adjustment module 64 calculates the lost fuel adjusted fuel command $F_B^0$ according to a lost fuel factor. A nominal fuel dynamics compensation module 66 receives the lost fuel adjusted fuel command $F_B^0$.

Those skilled in the art can appreciate that other implementations may not adjust for lost fuel initially at the base fuel command $F_B$. For example, the control module can be calibrated to command the base fuel command $F_B$ to be equivalent to a desired measured fuel. Under these circumstances lost fuel adjustment is not required, and the nominal fuel dynamics module 66 receives the base fuel command $F_B$ directly from the control module. Conventionally, however, control modules do not account for lost fuel. As such, control modules command the base fuel command $F_B$ to be much richer (i.e. greater) than the expected measured burned fuel.

The lost fuel adjustment module 64 calculates the lost fuel adjusted fuel command $F_B^0$ according to $F_B^0=F_B\times(1-\%\ LF)$, where % LF is the lost fuel factor. The lost fuel factor % LF is a piecewise linear function of manifold absolute pressure (MAP), engine speed in rotations per minute (RPM), coolant temperature (TCO), and intake valve temperature (IVT) for control modules that calculate IVT. Piecewise linear functions for % LF can be calibrated and implemented in a computationally efficient manner with the use of linear splines.

A method for using linear splines to model nonlinear behavior in internal combustion engines is described in more detail in U.S. Provisional Application No. 60/672,593, filed on Apr. 19, 2005, which is hereby incorporated by reference in its entirety. Under a linear splines formulation, the lost fuel factor % LF is:

$$\%\ LF=\theta_{i,j,k}+\alpha_i\times MAP+\beta_j\times RPM+\delta_k\times TCO$$

for scheduling lost fuel without IVT, and $$\%\ LF=\theta_{i,j,k,l}+\alpha_i\times MAP+\beta_j\times RPM+\delta_k\times TCO+\epsilon_l\times IVT$$

for scheduling with IVT, where i ranges from 1 to NMAP, j ranges from 1 to NRPM, k ranges from 1 to NTCO, and l ranges from 1 to NIVT. NMAP is a number of MAP ranges of data (or linear spline knots). RPM is a number of RPM ranges of data, NTCO is a number of TCO ranges of data, and NIVT is a number of IVT ranges of data. For example, a first exemplary RPM range of data may be 0 to 1000 RPM, and the linear spline knot would be 0. A second exemplary RPM range of data may be 1001 to 1500 RPM, and the linear spline knot would be 1001. In other words, the linear spline knots indicate the beginnings of each data range. Those skilled in the art can appreciate that the data ranges, and therefore the linear spline knots, can be chosen to best represent each variable in a piecewise linear fashion using linear spline formulation.

A MAP coefficient α is constant within each MAP range. However, the MAP coefficient α varies for different MAP ranges. Analogously, coefficients β, δ, and ϵ are constant within each RPM, TCO, and IVT range, respectively, but vary for different ranges. An offset θ varies for each MAP, RPM, TCO, and/or IVT range. As such, the lost fuel factor % LF can be represented linearly within each range. All offset terms and coefficients are selected in such a manner that the lost fuel factor % LF functions are continuous at the edges of the ranges of each variable.

The nominal fuel dynamics module 66 receives the lost fuel adjusted fuel command $F_B^0$ from the lost fuel adjustment module 64 and calculates a nominal compensated fuel command $F_D^0$. A lost fuel compensation module 68 receives the nominal compensated fuel command $F_D^0$ and calculates a final, lost-fuel compensated fuel command $F_D$. The lost fuel compensation module 68 calculates the final fuel command $F_D$ according to $F_D=F_D^0/(1-\%\ LF)$, where the lost fuel factor % LF is calculated as described above. In another implementation, the lost fuel compensation module uses linear splines to schedule the inverse lost fuel factor (invLFF) according to $$\frac{1}{1-\%\ LF}$$

and subsequently calculates % LF from the inverse lost fuel factor invLFF according to $$\% LF = 1 - \frac{1}{invLFF}.$$

The nominal fuel dynamics module 66 calculates the nominal compensated fuel command $F_D^0$ based on nominal fuel dynamics behavior. Ideally, nominal fuel dynamics compensation is the inverse of the engine's nominal fuel dynamics behavior. In other words, the nominal fuel dynamics behavior must be known and/or predicted, and the nominal compensated fuel command $F_D^0$ is calculated based on the known nominal fuel dynamics behavior. For example, partial differential equations may be used to model nominal fuel dynamics. In the present implementation, the nominal fuel dynamics behavior is modeled as an ordinary, non-linear differential difference equation. The coefficients of the differential difference equation are scheduled as a function of MAP, RPM, and TCO. A compensator equation is designed as the inverse of the model in order to determine the compensated fuel command $F_D^0$ based on the nominal fuel dynamics behavior.

The order of the model is not necessarily fixed because the true dynamics of the behavior are considerably more complicated. Instead, model (and hence compensator) order can be selected to balance model accuracy against calibration eters are fit such that the nominal fuel dynamics behavior model operating on the nominal compensated fuel command $F_D^0$ closely matches a measured burned fuel mass $F_M$. Additionally, because nominal fuel dynamics behavior is mass conservative, the model and compensator should have unit gain. For example, for a first order model and compensator, $\alpha_1+\alpha_2+\alpha_3=1$. For the second order and third order cases, $\alpha_1+\alpha_2+\alpha_3+\alpha_4+\alpha_5=1$ and $\alpha_1+\alpha_2+\alpha_3+\alpha_4+\alpha_5+\alpha_6+\alpha_7=1$, respectively.

The first order nominal fuel dynamics model is:

$$F_M(k) = \alpha_1 \times F_M(k-1) + \alpha_2 \times F_D^0(k) + \alpha_3 \times F_D^0(k-1) + \alpha_4 \times \Delta F_D^0(k)$$

$$\Delta F_D^0(k) = \begin{cases} 0 & \text{if } (F_D^0(k) - F_D^0(k-1)) < \Delta \\ F_D^0(k) - F_D^0(k-1) - \Delta & \text{otherwise} \end{cases}$$

The nominal fuel dynamics behavior is modeled as burned fuel mass $F_M(k)$.

The inverse of the burned fuel mass $F_M(k)$ is then formulated as:

$$F_n^0(k) = (F_B^0(k) - \alpha_1 \times F_B^0(k-1) - \alpha_3 \times F_D^0(k-1)) / \alpha_2,$$

$$F_D^0(k) = \begin{cases} F_n^0(k) & \text{if } (F_n^0(k) - F_D^0(k-1)) < \Delta \\ F_n^0(k) - \alpha_4 \times (F_n^0(k) - F_D^0(k-1) - \Delta) / (\alpha_2 + \alpha_4) & \text{otherwise} \end{cases}$$

efficiency and engine control module throughput requirements. The first, second, and third order models and compensators are described below. Although the exemplary models and compensators as describe include equivalent input and output degrees (lags), those skilled in the art can appreciate that models and compensators with different input and output degrees may be used.

The nominated compensated fuel command $F_D^0$ is formulated as a compensator function $F_D^0(k)$. In this manner, the nominal fuel dynamics compensation module 66 (as shown in FIG. 3) calculates the nominal compensated fuel command $F_D^0$ according to the compensator function $F_D^0(k)$.

The equations for the second order nominal fuel dynamics model and compensator are:

$$F_M(k) = \alpha_1 \times F_M(k-1) + \alpha_2 \times F_M(k-2) + \alpha_3 \times F_D^0(k) + \alpha_4 \times F_D^0(k-1) + \alpha_5 \times F_D^0(k-2) + \alpha_6 \times \Delta F_D^0(k)$$

$$\Delta F_D^0(k) = \begin{cases} 0 & \text{if } (F_D^0(k) - F_D^0(k-1)) < \Delta \\ F_D^0(k) - F_D^0(k-1) - \Delta & \text{otherwise} \end{cases}$$

and $$F_n^0(k) = (F_B^0(k) - \alpha_1 \times F_B^0(k-1) - \alpha_2 \times F_B^0(k-2) - \alpha_4 \times F_D^0(k-1) - \alpha_5 \times F_D^0(k-2)) / \alpha_3,$$

$$F_D^0(k) = \begin{cases} F_n^0(k) & \text{if } (F_n^0(k) - F_D^0(k-1)) < \Delta \\ F_n^0(k) - \alpha_6 \times (F_n^0(k) - F_D^0(k-1) - \Delta) / (\alpha_3 + \alpha_6) & \text{otherwise} \end{cases}$$

Standard System Identification methods are used to construct the models. The compensator is then derived analytically from the model by inverting the model. Model paramrespectively.

The equations for the third order nominal fuel dynamics model and compensator are:

$$F_M(k) = \alpha_1 \times F_M(k-1) + \alpha_2 \times F_M(k-2) + \alpha_3 \times F_M(k-3) + \alpha_4 \times F_D^0(k) + \alpha_5 \times F_D^0(k-1) + \alpha_6 \times F_D^0(k-2) + \alpha_7 \times F_D^0(k-3) + \alpha_8 \times \Delta F_D^0(k)$$

$$\Delta F_D^0(k) = \begin{cases} 0 & \text{if } (F_D^0(k) - F_D^0(k-1)) < \Delta \\ F_D^0(k) - F_D^0(k-1) - \Delta & \text{otherwise} \end{cases}$$

and $$F_n^0(k) = \begin{pmatrix} F_B^0(k) - \alpha_1 \times F_B^0(k-1) - \alpha_2 \times F_B^0(k-2) - \alpha_3 \times F_B^0(k-3) \\ a_5 \times F_D^0(k-1) - \alpha_6 \times F_D^0(k-2) - \alpha_7 \times F_D^0(k-3) \end{pmatrix} \Big/ \alpha_4,$$

$$F_D^0(k) = \begin{cases} F_n^0(k) & \text{if } (F_n^0(k) - F_D^0(k-1)) < \Delta \\ F_n^0(k) - \alpha_8 \times (F_n^0(k) - F_D^0(k-1) - \Delta) / (\alpha_4 + \alpha_8) & \text{otherwise} \end{cases}$$

respectively.

The gain terms $\alpha_i$ are scheduled according to a suitable scheduling method. Scheduling variables may include, but are not limited to, MAP, RPM, and TCO. Flexibly fueled engines may also schedule variables for alcohol concentration. In one implementation, the scheduling method is compound piecewise linear. For example, the model and compensator coefficients are piecewise linear functions of MAP and RPM, and MAP and RPM are piecewise linear functions of TCO. Alcohol concentration may be included in the set of scheduling variables when applicable. The alcohol concentration coefficients are piecewise linear functions of TCO. Compound piecewise linear scheduling permits easy calibration of the model and the control can be implemented in a computationally efficient manner through the use of linear spline technology as referenced above. Those skilled in the art can appreciate that other possible implementations of the scheduling method using linear splines with alternative scheduling variables and terms are anticipated.

For compound piecewise linear scheduling as a function of MAP, RPM, and TCO, the coefficients for each model and compensator are:

$$\alpha_i = (\lambda_{i,j,k,0} + \lambda_{i,j,k,1} \times TCO) + (\eta_{i,k,0} + \eta_{i,k,1} \times TCO) \times MAP + (\theta_{j,k,0} + \theta_{j,k,1} \times TCO) \times \mathrm{RPM},$$

where i ranges from 1 to NMAP, j ranges from 1 to NRPM, and k ranges from 1 to NTCO. The offsets λ, η, and θ are different for each MAP, RPM, and TCO ranges, respectively. The multiplying coefficients for MAP are constant within a MAP and TCO range, but vary for each MAP and TCO range. Similarly, the multiplying coefficients for RPM are constant within an RPM and TCO range, but vary for each RPM and TCO range. The offset terms and coefficients are selected so that the $\alpha_i$ functions are continuous at the edge of the ranges of each variable.

Figure 4:
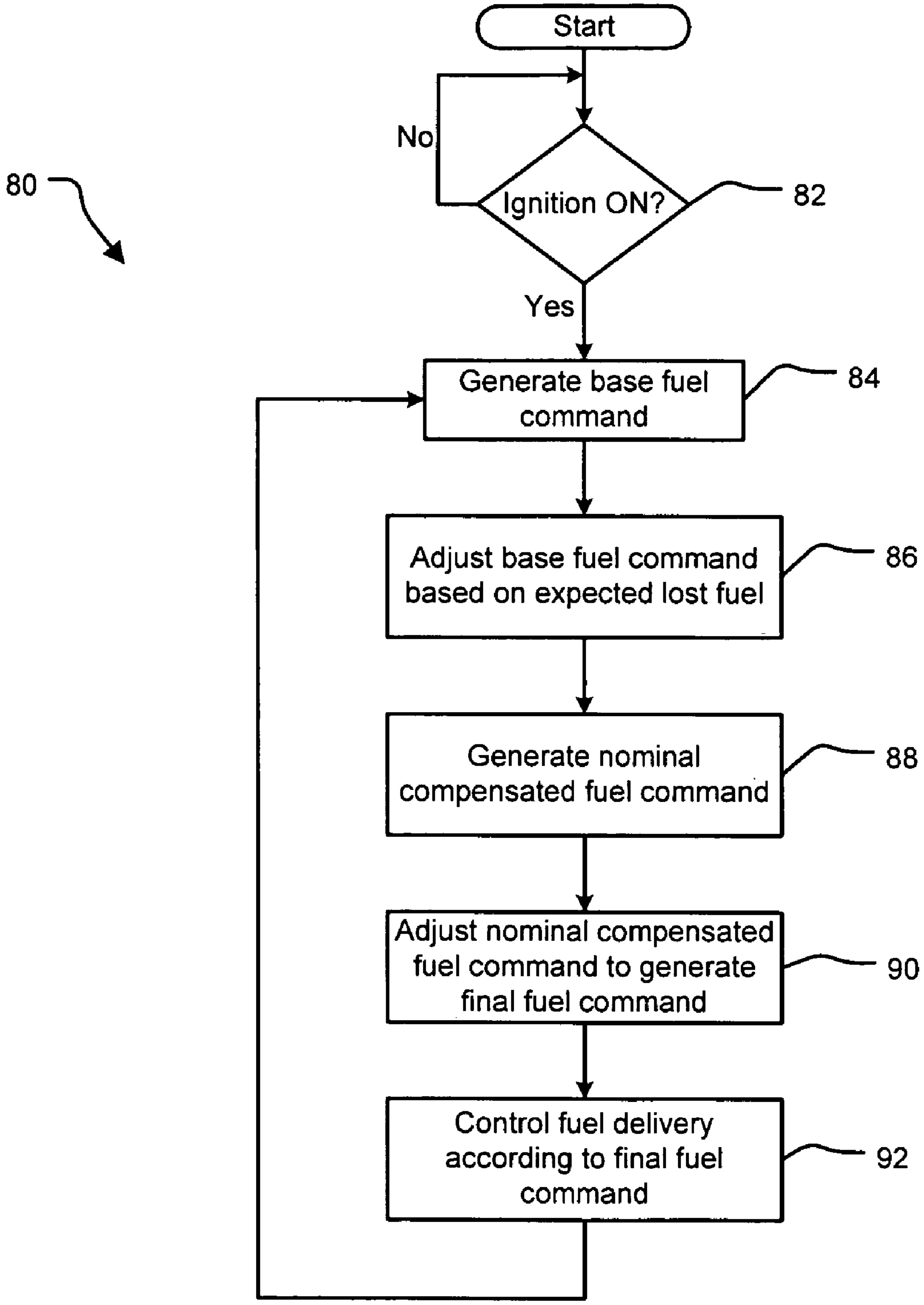
FIG. 4 is a flow diagram of a fuel control method according to the present invention.

The control module models fuel dynamics and controls fuel delivery according to a non-linear fuel dynamics with lost fuel compensation control method 80 as shown in FIG. 4. In step 82, the method 80 determines whether vehicle ignition is ON (i.e. whether the engine is running). If true, the method 80 continues to step 84. If false, the method 80 returns to step 82. In step 84, the method 80 generates a base fuel command. In the present implementation, the base fuel command is greater than actual measured fuel in order to compensate for lost fuel. In step 86, the method 80 adjusts the base fuel command according to expected lost fuel. In step 88, the method 80 generates a nominal compensated fuel command $F_D^0$ according to an inverse of the nominal fuel dynamics model as described with respect to FIG. 3. In step 90, the method 80 adjusts the nominal compensated fuel command $F_D^0$ according to lost fuel in order to generate a final, lost-fuel compensated fuel command $F_D$. The method 80 controls fuel delivery to the engine cylinder according to the final, lost-fuel compensated fuel command $F_D$ in step 92. The method returns to step 82 to continuously control fuel delivery.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A fuel control system comprising:

a fuel dynamics module that determines a fuel dynamics model that is indicative of fuel behavior, that determines an inverse of the fuel dynamics model, that receives a fuel command, and that generates an adjusted fuel command based on the fuel command and the inverse of the fuel dynamics model;

a lost fuel compensation module that receives the adjusted fuel command and generates a final fuel command based on the adjusted fuel command and a lost fuel factor; and a control module that controls fuel delivery according to the final fuel command.

2. The fuel control system of claim 1 wherein the fuel dynamics model is indicative of measured burned fuel mass.

3. The fuel control system of claim 1 wherein a sum of one or more coefficients of the fuel dynamics model is 1.

4. The fuel control system of claim 1 wherein the inverse of the fuel dynamics model is scheduled according to linear splines.

5. The fuel control system of claim 4 wherein one or more coefficients of the inverse of the fuel dynamics model are determined according to linear splines.

6. The fuel control system of claim 1 wherein the lost fuel factor is determined according to linear splines.

7. The fuel control system of claim 1 wherein the lost fuel factor is indicative of one of manifold absolute pressure, engine speed, intake valve temperature, and/or coolant temperature.

8. The fuel control system of claim 1 wherein the lost fuel factor is calculated according to an inverse lost fuel factor and the inverse lost fuel factor is indicative of one of manifold absolute pressure, engine speed, intake valve temperature, and/or coolant temperature.

9. The fuel control system of claim 1 further comprising a lost fuel adjustment module that receives the fuel command and adjusts the fuel command according to the lost fuel factor.

10. A fuel control method comprising:

generating a base fuel command;

determining a fuel dynamics model that is indicative of fuel behavior;

determining an inverse of the fuel dynamics model;

generating an adjusted fuel command based on the inverse of the fuel dynamics model and the base fuel command;

generating a final fuel command based on the adjusted fuel command and a lost fuel factor; and controlling fuel delivery according to the final fuel command.

11. The method of claim 10 further comprising scheduling the inverse of the fuel dynamics model according to linear splines.

12. The method of claim 10 further comprising calculating the lost fuel factor according to linear splines.

13. The method of claim 10 further comprising calculating the lost fuel factor according to an inverse lost fuel factor and calculating the inverse lost fuel factor according to linear splines.

14. The method of claim 10 further comprising adjusting the base fuel command according to the lost fuel factor.

* * * * *